Patented Feb. 4, 1936

2,029,376

UNITED STATES PATENT OFFICE 2,029,376

METHOD FOR MAKING A CATALYST

Henry Joseph, Rosedale, N. Y., assignor to General Chemical Company, New York, N. Y., a corporation of New York No Drawing. Application March 13, 1931, Serial No. 522,505

19 Claims. (Cl. 23—234)

This invention is directed to a method for making a catalyst adaptable for use in catalytic oxidation processes. Generally considered, the invention relates to a process for making a vanadium catalyst particularly suited for use in connection with the production of sulfuric anhydride from gases containing sulfur dioxide and oxygen by the well known contact process. More specifically, the invention is directed to a process for making a catalyst by which a more even dispersion and distribution of the catalytically active substance throughout the catalytic mass is obtained, and by which the catalytic mass during the manufacture thereof is so conditioned physically as to render the same readily adaptable for molding operations.

The primary object of the invention lies in the provision of a process for the production of a catalyst, and particularly a vanadium catalyst, by which local crystallization of soluble salts in the form of relatively large aggregates of catalytically active substances during the preparation of the catalyst is prevented. A further object of the invention is directed to the provision of a process for making an improved catalyst by which a more even dispersion and distribution of the catalytically active substance through the catalytic mass is secured, and by which a more uniform mixture of catalytically active substances and inert carrier is obtained. Another object of the invention resides in the provision of a process for making a catalyst according to which, by the employment of a substance which acts as a temporary binder but which does not interfere with the catalytic activity of the final product, the catalytic mass during the manufacture thereof is rendered in such condition physically as to readily facilitate the formation of the product in molded masses. Yet another object of the invention lies in the provision of a process for making a catalyst having a porous structure by the utilization of a substance which, after having served during the preliminary stages of the process as a dispersing agent and a temporary binder may be removed from the catalyst in such manner as to materially increase the porosity of the final catalytic mass.

It has been found that certain organic materials of colloidal nature serve as dispersing agents to prevent the local crystallization of soluble salts in the form of relatively large aggregates during the preparation of the catalyst and to effect a more uniform distribution of the catalytically active substances throughout the mass of catalytic material. Beyond this, it has been discovered that such organic materials act at the same time as a temporary binder for the material during the formation thereof into pellets by molding operations. It has further been found, contrary to expectation, that such organic materials after having served the aforementioned purposes may, by suitable treatment of the catalyst, be converted into non-deleterious forms which in no way detract from or interfere with the catalytic activity of the catalyst, and which may be removed from the catalytic mass in such manner that the porosity and consequently the activity thereof is materially increased.

Briefly summarized, the invention comprises initially the incorporation of an organic dispersing agent with a catalyst mix, preferably by forming a uniform dry mixture of a finely divided, preferably silicious carrier, and a relatively small quantity of organic dispersing agent, preferably together with a stabilizing agent the purpose of which will hereinafter appear. The dry mixture thus formed is impregnated with a solution of a vanadium compound, and the mass then is evaporated to such degree of dryness as will facilitate granulation or formation into pellet form. After granulation or formation into pellets the material is subjected to baking to harden the catalyst and to oxidize and convert the organic material contained therein to non-deleterious forms which do not interfere with the catalytic activity of the finished product, and whereby the organic material is removed from the catalytic mass in such manner that the porosity of the final product is materially increased.

The details of the process may be varied in several ways, and different modifications with respect to the quantities of raw materials utilized may be had without departure from the scope of the invention. For purpose of illustration only, the following detailed descriptions are given of preferred methods of carrying out the invention using specific materials and definite quantities thereof.

*Example 1.*—Mix dry 150 pounds of kieselguhr, which may previously have been heated to a red heat, 10 pounds of gum tragacanth and 20 pounds of potassium sulfate. While agitating the dry mixture of kieselguhr, gum and potassium sulfate, add thereto a sodium vanadate solution prepared by treating 16 pounds of $V_2O_5$ with 10 gallons of water containing therein 11.3 pounds of sodium hydroxide. Dilute the mixture with about 20 gallons of water, and after the mixture has been thoroughly effected add sulfuric acid to substantially neutralize the mix, preferably retaining the mix slightly alkaline. Continue the mixing and evaporate until the mixture is reduced to a consistency suitable to permit granulation or pelleting. Then heat the material for about one hour at a temperature of approximately 600° C. The product is now ready for use as a catalyst in the production of sulfuric anhydride from gases containing sulfur dioxide and oxygen by the contact process.

Example 2.—Mix dry 316 parts kieselguhr which may previously have been heated to a red heat, with 21 parts gum tragacanth. While agitating the dry mixture of kieselguhr and gum add thereto an aqueous solution of 50 parts ammonium vanadate and 56 parts of potassium hydrate. Continue mixing and evaporate off a sufficient quantity of water so that the mass may be formed into granules or pellets. Place the material in granular form in a furnace and heat gradually, preferably with or in the presence of a gas containing sulfur dioxide and oxygen, until a temperature of 600° C. has been attained, and then if desired continue the heating for some time in a current of air. The product of this operation is a catalytic agent adapted for use in connection with the production of sulfuric anhydride from gases containing sulfur dioxide and oxygen by the contact process.

The potassium sulfate, in the one instance incorporated into the initial dry mix of finely divided carrier and organic agent, and the potassium hydrate, in the second instance mixed with the ammonium vanadate, aid as stabilizing agents acting to protect the catalysts from deteriorating in activity and to overcome any hygroscopic properties the final products may possess, and further enhance the catalytic properties of the final products. Substances other than potassium sulfate and potassium hydrate, for example sodium sulfate or hydrate, or carbonates of sodium or potassium may be employed.

Although it is preferred in most instances to use kieselguhr, as described, other carriers such as finely ground pumice, precipitated silica, stannic hydroxide, or stannic oxid or mixtures of all or any of these are also suitable.

It has been found that gum tragacanth and gum karaya are well adapted to serve the purposes of the invention as organic dispersing agents and binders. While the use of either of these gums, and particularly gum tragacanth, is preferred, other organic gums known as kadaya and maura gum, kuteragummi and moringagummi, and gums of the type consisting of a plant exudation are quite suitable, and in the appended claims, the term "gum" refers to vegetable gums of this general type. The amount of the organic dispersing agent and binder utilized in the dry mix may vary widely. It is preferred to use the gum in powdered form in amounts not substantially exceeding 5% of the total weight of dry materials utilized in the preparation of the catalyst. Satisfactory results have been obtained when using the gum in such amounts. Although it is preferred to mix the gum and the carrier dry for the reason that by so doing a more even distribution of the gum throughout the mass may thus be obtained, the addition of the gum in this manner is not essential, for the gum may be added after or during the mixing of the carrier and the vanadate solution.

Obviously where, as in Example 1, acid is used to neutralize the mix before evaporation and drying, the quantity employed may be varied in accordance with the requirements of the batch, such quantities of acid being utilized as may be necessary to render the mix substantially neutral or slightly alkaline, and at the same time to incidentally avoid corrosion of the apparatus. It is also obvious that the details of drying and granulating prior to pelleting by suitable molding operations may be varied. The only precaution which should preferably be adhered to is the regulation of the drying so that just prior to pelleting the material should preferably contain about 4-5% water. These limits, of course, are dependent on the type of machine used for pelleting. In general, if the material is too dry, the pellets are too soft and a large percentage is broken, whereas if the material is too wet, the pellets stick to the machines and necessitate the shutdown of the machines to permit cleaning.

The procedure during the final heating or baking of the pellets before the catalytic material is used in the contact process may be varied. The baking and the sulfating in the sulfur dioxide gas may be carried out concurrently or as separate steps. In the latter instance, the baking of the pellets at a temperature of about 600° C. precedes the sulfating step. In either event, the baking serves to harden the catalyst, and to oxidize and burn out the organic matter which has previously functioned to disperse the catalytically active substance throughout the mass and to render the mass in such physical condition as to be readily adaptable for molding operations. The baking of the pellets in addition to causing the oxidation of the organic matter has the important effect of increasing the porosity and consequently the activity of the final product, by reason of the substantially complete removal of the organic material from the catalytic mass. On removal of the organic material, the porosity of the pellets is increased to the extent of the interstices initially occupied by the organic material prior to oxidation by the baking step.

I claim:

1. The method of preparing a vanadium catalyst which comprises forming a mixture of a finely divided carrier and an organic gum, adding to the mixture a solution of a vanadium compound, and then heating the mass so formed to oxidize the organic material contained therein and to produce a vanadium catalyst.

2. The method of preparing a vanadium catalyst which comprises forming a mixture of a finely divided carrier and an organic gum, agitating the mixture, and adding to the mixture while agitating the same a vanadate solution, and heating the mass so formed to oxidize the organic material contained therein.

3. The method of preparing a vanadium catalyst which comprises forming a mixture of a finely divided carrier and an organic gum, adding to the mixture a vanadate solution, reducing the mass so formed to dryness sufficient to permit granulation, granulating the dried mass, and baking the granulated mass to oxidize the organic material contained therein.

4. The method of preparing a vanadium catalyst which comprises forming a mixture of a finely divided carrier and an organic gum, agitating the mixture, adding to the mixture while agitating the same a vanadate solution, reducing the mass so formed to dryness sufficient to permit granulation, granulating the dried mass, and baking the granulated mass to oxidize the organic material contained therein.

5. The method of preparing a vanadium catalyst which comprises forming a mixture of a finely divided carrier, a compound of an alkaline metal and an organic gum, adding to the mixture a solution of a vanadium compound, and heating the mass so formed to oxidize the organic material contained therein.

6. The method of preparing a vanadium catalyst which comprises forming a mixture of a finely divided carrier, a compound of an alkaline metal, and an organic gum, adding to the mixture a vanadate solution, reducing the mass so formed to dryness sufficient to permit granulation, granulating the dried mass, and baking the granulated mass to oxidize the organic material contained therein.

7. The method of preparing a vanadium catalyst which comprises forming a mixture of a finely divided carrier, a compound of an alkaline metal, and an organic gum, agitating the mixture, and adding to the mixture while agitating the same a vanadate solution, reducing the mass so formed to dryness sufficient to permit granulation, granulating the dried mass, and baking the granulated material to oxidize the organic material contained therein.

8. The method of preparing a vanadium catalyst which comprises forming a mixture of a finely divided carrier and an organic gum in an amount not exceeding substantially 5% of the weight of the total dry material, adding to the mixture a vanadate solution, and heating the mass so formed to oxidize the organic material contained therein.

9. The method of preparing a vanadium catalyst which comprises forming a mixture of a finely divided carrier, a compound of an alkaline metal, and an organic gum in an amount not exceeding substantially 5% of the weight of the total dry material, adding to the mixture a vanadate solution, and heating the mass so formed to oxidize the organic material contained therein.

10. The method of preparing a vanadium catalyst which comprises forming a mixture of a finely divided carrier, a compound of an alkaline metal, and an organic gum in an amount not exceeding substantially 5% of the weight of the total dry material, agitating the mixture, and adding to the mixture while agitating the same a vanadate solution, and heating the mass so formed to oxidize the organic material contained therein.

11. The method of preparing a vanadium catalyst which comprises forming a mixture of a finely divided carrier, a compound of an alkaline metal, and an organic gum in an amount not exceeding substantially 5% of the weight of the total dry material, agitating the mixture, and adding to the mixture while agitating the same a vanadate solution, reducing the mass to dryness sufficient to permit granulation, granulating the mass, and baking the granulated mass to oxidize the organic material contained therein.

12. The method of preparing a vanadium catalyst which comprises forming a mixture of a finely divided carrier and an organic gum, agitating the mixture and adding to the mixture while agitating the same a sodium vanadate solution, neutralizing the mixture thus formed, reducing the mass to dryness sufficient to permit granulation, granulating the mass and baking the granulated material to oxidize the organic material contained therein.

13. The method of preparing a vanadium catalyst which comprises forming a mixture of a finely divided carrier, potassium sulfate and an organic gum, agitating the mixture and adding to the mixture while agitating the same a sodium vanadate solution, neutralizing the mixture thus formed, reducing the mass to dryness sufficient to permit granulation, granulating the mass, and baking the granulated material to oxidize the organic material contained therein.

14. The method of preparing a vanadium catalyst which comprises forming a mixture of a finely divided carrier, potassium sulfate, and an organic gum in an amount not exceeding substantially 5% of the weight of the total dry material, agitating the mixture, and adding to the mixture while agitating the same a sodium vanadate solution, neutralizing the mixture thus formed, heating the mass to reduce to dryness sufficient to permit granulation, granulating the mass, and baking the granulated material to oxidize the organic material contained therein.

15. The method of preparing a vanadium catalyst which comprises forming a mixture of a finely divided silicious carrier, potassium sulfate, and gum tragacanth in an amount not exceeding substantially 5% of the weight of the total dry material, agitating the mixture, and adding to the mixture while agitating the same a hot sodium vanadate solution, diluting the mixture so formed with water, adding sulfuric acid thereto in an amount sufficient to neutralize the mixture, heating the mass to reduce to dryness sufficient to permit granulation, granulating the mass, and baking the granulated material to oxidize the organic material contained therein.

16. The method of preparing a vanadium catalyst which comprises forming a mixture of a finely divided carrier, an organic gum, and a solution of a vanadium compound, and heating the mass so formed to oxidize the organic material contained therein and to produce a vanadium catalyst.

17. The method of preparing a vanadium catalyst which comprises forming a mixture of a finely divided carrier, an organic gum, and a vanadium compound dissolved in water, and heating the mass so formed to oxidize the organic material contained therein and to produce a vanadium catalyst.

18. The method of preparing a vanadium catalyst which comprises forming a mixture of a finely divided carrier, an organic gum, a compound of an alkaline metal, and a solution of a vanadium compound, and heating the mass so formed to oxidize the organic material contained therein and to produce a vanadium catalyst.

19. The method of preparing a vanadium catalyst which comprises forming a mixture of a finely divided carrier and an organic gum, adding to the mixture a solution containing a vanadium compound and a compound of an alkaline metal, and heating the mass so formed to oxidize the organic material contained therein and to produce a vanadium catalyst.

HENRY JOSEPH.